Figure 1:
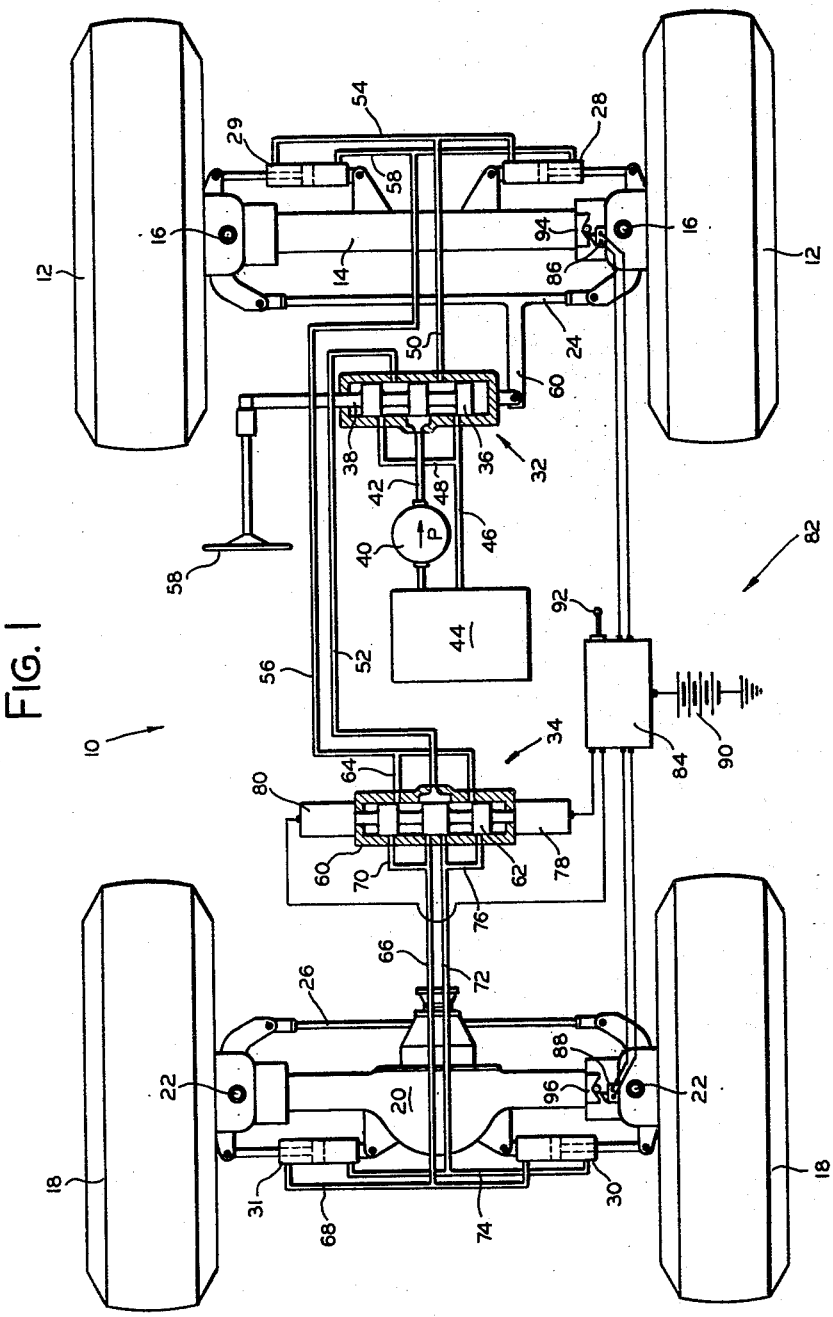

May 25, 1965  D. R. HOYT  3,185,245
STEERING MODE SELECTION AND WHEEL SYNCHRONIZATION SYSTEM
Filed Dec. 31, 1962  2 Sheets-Sheet 2

INVENTOR
DERYL R. HOYT
BY
ATTORNEY

United States Patent Office 3,185,245
Patented May 25, 1965

3,185,245
STEERING MODE SELECTION AND WHEEL
SYNCHRONIZATION SYSTEM
Deryl R. Hoyt, Battle Creek, Mich., assignor to Clark
Equipment Company, a corporation of Michigan
Filed Dec. 31, 1962, Ser. No. 248,372
10 Claims. (Cl. 180—79.2)

This invention relates to steering mode selection and wheel synchronization systems, and more particularly to such systems which are suitable for use with steering systems capable of conventional two-wheel steering, oblique or lateral steering and conventional four-wheel steering. By oblique or lateral steering I mean that in a vehicle having two pairs of dirigible wheels all of them pivot simultaneously in the same direction with the result that the vehicle moves sideways without changing its heading. By four-wheel steering I mean that in a vehicle having two pairs of dirigible wheels one of the pairs of dirigible wheels pivots in one direction while the other pair of dirigible wheels pivots simultaneously in the opposite direction with the result that both pairs of wheels follow the same arc during turning.

In steering systems capable of two or more different modes of steering some kind of means must be provided for maintaining the wheels synchronized when shifting from one mode of steering to another. Heretofore such means have been relatively expensive, complex, easily put out of adjustment or some combination of the above. Therefore, one of the principal objects of my invention is to provide a wheel synchronization system that is inexpensive, simple and rugged.

I have noted that in steering systems capable of two-wheel, oblique and four-wheel steering that the dirigible wheels have a common disposition for all three modes of steering, namely straight-ahead. By straight-ahead I mean that the dirigible wheels are disposed parallel to the longitudinal axis of the vehicle with which they are associated. Thus, a further object of my invention is to provide a steering mode selection and wheel synchronization system that permits a change from four wheel steering to oblique steering or vice versa and from two wheel steering to four wheel or oblique steering only when the dirigible wheels are all disposed in a straight-ahead position.

Another object of my invention is to provide an improved steering mode selection and wheel synchronization system.

In carrying out my invention in a preferred embodiment thereof I provide a steering mode selector valve and first and second means for actuating it. A steering mode selector switch is connectible to a power source and operable to connect the first actuating means, the second actuating means or neither one of the actuating means to the power source. There also is included means for preventing energization of the first or second actuating means when a first pair of dirigible wheels is not disposed substantially straight-ahead, means for preventing de-energization of the first or second actuating means when a second pair of dirigible wheels is not disposed substantially straight-ahead and means for preventing energization of one of the actuating means when the other actuating means is already energized.

Figure 2:
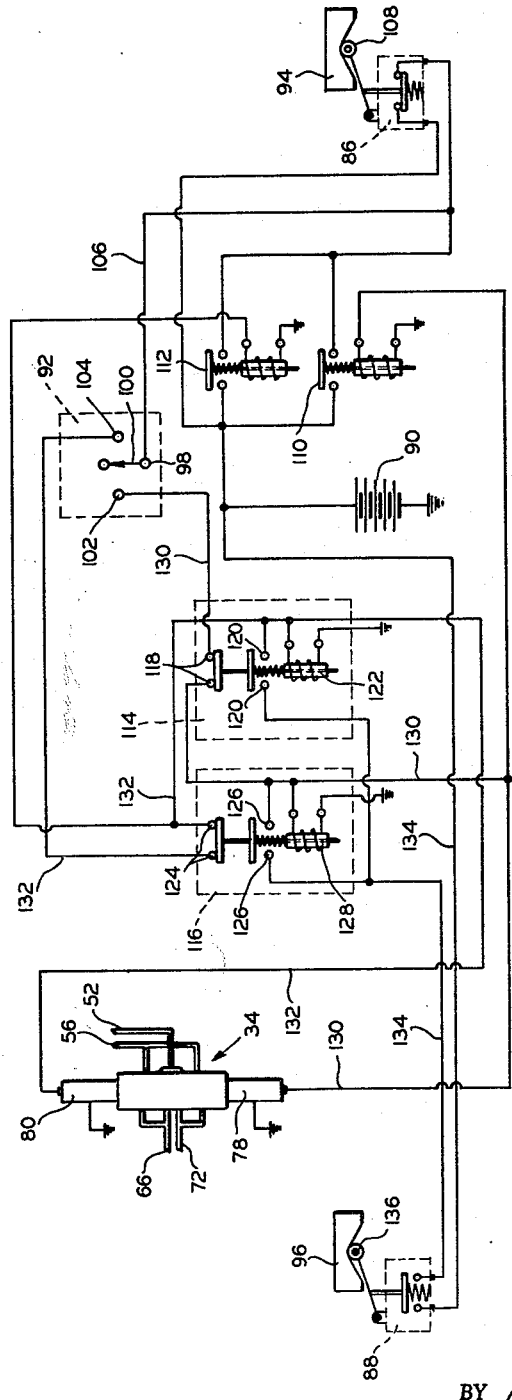

The above and other objects, features and advantages of my invention will become more readily apparent to persons skilled in the art when the following detailed description is taken in conjunction with the accompanying drawing wherein:

FIGURE 1 is a schematic representation of a steering system having two pairs of dirigible wheels and embodying my invention, and FIGURE 2 is a diagram of a preferred embodiment of my invention.

Referring to FIG. 1, the numeral 10 denotes generally a power steering system having a first pair of dirigible wheels 12 mounted at the ends of an axle 14 for rotation about a horizontal axis and pivotal movement about vertical axes 16 and a second pair of dirigible wheels 18 mounted at the ends of a drive axle 20 for rotation about a horizontal axis and pivotal movement about vertical axes 22. The first pair of dirigible wheels 12 are connected by means of a tie rod 24 and the second pair of dirigible wheels 18 are connected by a tie rod 26.

Turning now to the hydraulic or fluid portion of power steering system 10, a pair of piston and cylinder type fluid motors or actuators 28 and 29 are each connected at one end to axle 14 and at the other end thereof to the adjacent one of dirigible wheels 12. Similarly, a pair of piston and cylinder type fluid motors or actuators 30 and 31 are each connected at one end to drive axle 20 and at the other end thereof to the adjacent one of dirigible wheels 18. Fluid motors 28, 29, 30 and 31 are controlled by a steering control valve 32 and a steering mode selector valve 34, as will be explained in detail hereinbelow.

Control valve 32 includes a body 36 with a bore and a spool 38 slidably disposed in the bore. Control valve 32 is supplied with pressurized fluid from a pump 40 via a conduit 42 which is connected to valve body 36, pump 40 drawing fluid from a reservoir or sump 44. A pair of conduits 46 and 48 connect opposite ends of body 36 directly with reservoir 44 so that with spool 38 in the position shown there is a substantially unrestricted fluid flow from pump 40 through valve 36 and back to the reservoir 44. This is the neutral or centered position of control valve 32. Also connected to valve body 36 is a pair of conduits 50 and 52. Conduit 50 communicates with a conduit 54 which connects the head end of fluid motor 28 with the rod end of fluid motor 29. Conduit 52 communicates with selector valve 34, and through selector valve 34, as will be explained in greater detail shortly, with a conduit 56 which connects with a conduit 58. Conduit 58 connects the head end of fluid motor 29 and the rod end of fluid motor 28. At this point it will be seen that supplying conduit 50 with pressurized fluid causes dirigible wheels 12 to pivot in a clockwise direction, and similarly supplying conduit 52 with pressurized fluid will cause dirigible wheels 12 to pivot in a counterclockwise direction.

Valve spool 38 is connected to an operator's steering control wheel 58 so that clockwise movement of control wheel 58, as viewed from the left in FIG. 1, will result in an upward or leftward movement of spool 38 and a counterclockwise movement of control wheel 58 will result in a downward or rightward movement of spool 38. Upward movement of spool 38 from the position shown in FIG. 1 will cause conduit 42 to be connected to conduit 50 and conduit 52 to be connected to the reservoir 44 via conduits 48 and 46 so that pressurized fluid is supplied to fluid motors 28 and 29 via conduit 50 with the result that dirigible wheels pivot in a clockwise direction. Similarly, if spool 38 is moved downward from the position shown in FIG. 1, then conduit 52 is connected to conduit 42 and conduit 50 is connected to reservoir 44 via conduit 46 so that pressurized fluid is supplied to fluid motors 28 and 29 via conduit 56 with the result that dirigible wheels 12 pivot in a counterclockwise direction. It also will be noted that valve body 36 is connected to tie rod 24 by means of a link 60. This connection provides a follow-up for control valve 32, that is, dirigible wheels 12 will continue to move only so long as spool 38 continues to move.

Referring now to selector valve 34, it includes a body 60 having a bore therein and a spool 62 slidably disposed within the bore. As pointed out hereinabove, conduit 52 is connected to body 60 centrally thereof. Opposite ends of body 60 are connected to conduit 58 by means of conduit 56 and a connecting conduit 64. With spool 62 in the position shown in FIG. 1, valve 34 serves merely to connect conduit 52 and conduit 56.

A conduit 66 connects valve body 60 with a conduit 68 which connects the head end of fluid motor 30 with the rod end of fluid motor 31. Also, conduit 66 is connected to body 60 by another conduit 70. Conduit 72 connects valve body 60 with a conduit 74 which connects the head end of fluid motor 31 with the rod end of fluid motor 30. Conduit 72 also is connected to valve body 60 by a conduit 76.

From the foregoing description of selector valve 34, it will be apparent that when valve spool 62 is in the position shown in FIG. 1 that communication of conduits 66, 70, 72 and 76 with conduits 52, 56 and 64 is blocked by the lands of spool 62 so that wheels 18 are hydraulically locked from pivotal movement; that actuation of valve spool 62 downwardly will connect conduct 52 with conduit 66 and conduit 56 with conduit 72 via conduit conduit 76 so that dirigible wheels 12 and 18 pivot in the same direction simultaneously to provide oblique or lateral steering; and that upward movement of spool valve 62 connects conduit 52 with conduit 72 and conduit 56 with conduit 66 via conduit 70 so that dirigible wheels 12 and 18 pivot simultaneously in opposite directions to provide conventional four-wheel steering.

Connected to opposite ends of valve spool 62 is a pair of solenoids 78 and 80 arranged so that when neither solenoid is energized spool 62 is maintained in the centered position, shown in FIG. 1; when solenoid 78 is energized spool 62 is moved downward so that conduit 52 is connected to conduit 66 and conduit 56 is connected to conduit 72; and when solenoid 80 is energized spool 62 is moved upward so that conduit 52 is connected to conduit 72 and conduit 56 is connected to conduit 66.

Power steering system 10 includes a steering mode selection and wheel synchronization system 82 which, broadly speaking, operates by correlating the energization of solenoids 78 and 80 and the position of dirigible wheels 18 and 20. Steering mode selection and wheel synchronization system 82 includes a main control box 84 to which solenoids 78 and 80 and a pair of switches 86 and 88 are connected by suitable electric circuitry as will be explained in more detail shortly. Also connected to control box 84 is a battery 90 which has one side thereof grounded. Mounted on control box 84 is a three-position steering mode selector switch 92. By proper manipulation of selector switch 92 an operator may select any one of the three previously-described modes of steering of which steering system 10 is capable.

Switch 86 is mounted on one of dirigible wheels 12 and engages a cam 94 fixed to axle 14. Consequently, pivotal movement in either direction of the dirigible wheel to which switch 86 is attached will result in actuation of the switch. Likewise, switch 88 is attached to one of dirigible wheels 18 and engages a cam 96 fixed to drive axle 20 so that pivotal movement in either direction of the wheel to which switch 88 is attached causes actuation of the switch.

Referring now to FIGURE 2, the steering mode selection and wheel synchronization system 82 is shown in greater detail, including the various switches and circuits contained in main control box 84.

Selector switch 92 includes a central contact 98 to which is connected a blade member 100 that is actuatable between three positions to connect central contact 98 with a contact 102, a contact 104 or neither one of contacts 102 and 104, as shown. Central contact 98 is connectible to battery 90 by means of a circuit 106 which includes switch 86. Switch 86 is a normally-closed switch and includes a cam follower 108 which cooperates with cam 94 so that when wheels 12 pivot from a substantially straight-ahead position the cam follower 108 moves up the sides of cam 94 to open switch 86. Connected in parallel circuit with switch 86 is a pair of normally-open solenoid-actuated switches 110 and 112 which also are connected in parallel with each other. As will be seen later these switches 110 and 112 serve to bypass switch 86.

The steering mode selection wheel synchronization system 82 further includes a pair of dual switches 114 and 116 which are solenoid-actuated. Dual switch 114 includes a pair of normally-closed contacts 118 and a pair of normally-open contacts 120 and a solenoid 122. Contacts 118 and 120 are arranged so that when solenoid 122 is energized contacts 118 open and contacts 120 close. Dual switch 116 is identical in construction to dual switch 114 and includes a pair of normally-closed contacts 124, a pair of normally-open contacts 126 and a solenoid 128. The contacts 124 and 126 are arranged so that when solenoid 128 is energized contacts 124 are opened and contacts 126 are closed.

A circuit 130 connects contact 102 with solenoid 78 and includes normally-closed contacts 118. Also solenoid 128 of dual switch 116 is connected to circuit 130. In a similar manner, a circuit 132 connects contact 104 with solenoid 80 and includes normally-closed contacts 124. Also, solenoid 122 is connected to circuit 132. It will now be apparent that dual switches 114 and 116 serve to interlock circuits 130 and 132. That is, when circuit 130 is energized contacts 124 will be open, thereby preventing energization of circuit 132. Likewise, when circuit 132 is energized contacts 118 will be open, thereby preventing energization of circuit 130.

It also is to be noted that the solenoid of switch 110 is connected to circuit 130 so that switch 110 is actuated to close when circuit 130 is energized. Likewise, the solenoid of switch 112 is connected to circuit 132 so that switch 112 is actuated to close when circuit 132 is energized. Consequently, when either circuit 130 or 132 is energized switch 86 will be bypassed.

A circuit 134 connects circuits 130 and 132 with circuit 106 and includes normally-open contacts 120 and 126 disposed in parallel and connected to circuits 132 and 130, respectively. Circuit 134 also includes switch 88 which is disposed in series with contacts 120 and 126. Switch 88 is a normally-open switch and includes a cam follower 136 which engages cam 96. Cam follower 136 cooperates with cam 96 so that when dirigible wheels 18 are pivoted from a substantially straight-ahead position, as shown in FIGURE 1, cam follower 136 moves up the sides of cam 96 and causes switch 88 to close. Circuit 134 functions as a hold-in circuit, that is, when either solenoid 78 or 80 has been energized and switch 88 has been closed, the energized solenoid cannot be de-energized until switch 88 is again opened.

The electrical system described above is a single wire or grounded system. That is, the battery 90 and the various solenoids have one side connected to a common ground, in this case the frame of the associated vehicle. Thus, it is only necessary to have a single conductor between the battery and the various solenoids in order to complete the electrical circuit. Such a grounded electrical system is conventional in automobiles and other similar vehicles, and so need not be explained further.

I will now describe the operation of the above-described embodiment of my invention. It will be assumed that the vehicle with which power steering system 10 is associated is moving forwardly, that is, to the right as viewed in FIGURE 1, and further than it is conditioned for two-wheel steering with selector switch 92 positioned as shown in FIGURE 2 and selector valve 34 positioned as shown in FIGURE 1.

Now, if the operator desires to change from two-wheel steering to oblique steering, then he manipulates switch 92 so that blade member 100 connects contacts 98 and 102. Connecting contacts 98 and 102 completes the electrical circuit between battery 90 and solenoid 78 so that it is energized and actuates valve spool 62 downwardly to connect conduit 52 with conduit 66 and conduit 56 with conduit 72 (FIGURE 1), thereby conditioning power steering system 10 for oblique steering. At this point it will be noted that to initially energize solenoid 78 it is necessary that switch 86 be closed, or, in other words, that wheels 12 be disposed in their substantially straight-ahead position when changing from two-wheel steering to oblique steering. Further, completing the electrical circuit between battery 90 and solenoid 78 also results in the energization of solenoid 128 which causes contacts 124 to open and contacts 126 to close, opening of contacts 124 preventing solenoid 80 from being energized when solenoid 78 is energized. Additionally, the solenoid-actuated switch 110 is energized to close.

Assuming now that the operator wishes to move the vehicle obliquely toward the right, he turns steering control wheel 58 in a clockwise direction which results in dirigible wheels 12 and 18 simultaneously pivoting in a clockwise direction. This results in switch 86 opening due to the movement of cam 94 and switch 88 closing due to the movement of cam 96. The opening of switch 86 will have no effect upon the energization of solenoid 78 since, as was pointed out previously, switch 110 is closed and is in parallel circuit with switch 86. Closing of switch 88 completes the electrical circuit between circuit 130 and circuit 106 through contacts 126 and functions to maintain solenoid 78 energized so long as switch 88 is closed. At this point it will be seen that actuation of selector switch 92 to open contacts 98 and 102 or connect contacts 98 and 104 has no effect upon the energization of either solenoid 78 or 80 as long as switch 88 is maintained closed.

If the operator now pivots dual wheels 12 and 18 counterclockwise from a position to the right of their straight-ahead position to a position to the left of their straight-ahead position solenoid 78 will be maintained energized at all times, assuming that contacts 98 and 102 remain connected.

Assuming now that while the vehicle is proceeding obliquely to the right that the operator wishes to change to two-wheel steer, he will actuate selector switch 92 to break the connection between contacts 98 and 102. At this point there will be no change in the steering mode since solenoid 78 will be maintained energized, as pointed out previously. In order to complete the change from oblique steering to two-wheel steering it also is necessary to position wheels 18 in their straight-ahead positions. Assume, therefore, that the operator actuates steering control wheel 58 so that wheels 18 pivot to their straight-ahead position. As wheels 18 reach their straight-ahead position, switch 88 opens and solenoid 78 is de-energized since there no longer is a complete electrical circuit between solenoids 78 and battery 90. At this point steering system 10 is again conditioned for two-wheel steering.

Returning now to the steering condition in which the vehicle is moving obliquely to the right, it will be assumed that the operator wishes to change to four-wheel steering rather than oblique steering, and so actuates selector switch 92 to connect contacts 98 and 104. For the reasons pointed out above, opening the connection between contacts 98 and 102 and reconnecting contact 98 with contact 104 has no effect upon the energization of solenoid 78 as long as wheels 12 and 18 are not disposed in their straight-ahead positions. Further assuming now that the operator manipulates steering control wheel 58 so that wheels 12 and 18 pivot in a counterclockwise direction to their straight-ahead positions, switch 88 will open with the result that solenoid 78 will be de-energized. Now, if wheels 12 also are disposed substantially in their straight-ahead position so that switch 86 is closed, the electrical circuit between battery 90 and solenoid 80 will be completed so that valve spool 62 is actuated upwardly to connect conduit 52 with conduit 76 and conduit 56 with conduit 66 (FIG. 1) so that the power steering system 10 is conditioned for four-wheel steering. If, by chance, the wheels 12 are out of phase with wheels 18, that is, either slightly ahead or slightly behind them in pivotal movement, then switch 86 will be open when switch 88 opens so that steering system 10 will change from oblique steering to two-wheel steering rather than four-wheel steering. However, as soon as wheels 12 are disposed substantially in their straight-ahead position, so that switch 86 is closed, the change to four-wheel steering will be completed. This has the effect of maintaining wheels 12 and 18 in phase or synchronized.

Returning now to the situation where power steering system 10 is conditioned for two-wheel drive and the associated vehicle is moving forwardly, it will be assumed that the operator now wishes to change from two-wheel steering to four-wheel steering. In order to accomplish this the operator actuates selector switch 92 so that blade member 100 connects contact 98 with contact 104 to complete the electrical circuit between battery 90 and solenoid 80, thereby actuating valve spool 62 upwardly to connect conduit 52 with conduit 72 and conduit 56 with conduit 66 (FIG. 1) so that steering system 10 is conditioned for four-wheel steering. Energization of circuit 132 energizes solenoid-actuated switch 112 to close and also energizes solenoid 122 so that contacts 118 are opened and contacts 120 are closed. As pointed out previously, opening of contacts 118 prevents circuit 130 from being energized.

If the operator now wishes, for example, to turn to the right he manipulates steering control wheel 58 so that wheels 12 pivot in a clockwise direction. At the same time wheels 18 will pivot in a counterclockwise direction. As wheels 12 pivot to the right away from their substantially straight-ahead position, switch 86 opens due to the cooperation of cam 94 and cam follower 108; however, this has no effect on the energization of solenoid 80 because switch 112 which is in parallel with switch 86 previously has been closed. Also, as wheels 18 pivot away from their straight-ahead position, switch 88 closes, thereby completing the electrical circuit between circuit 132 and circuit 106 through previously-closed contacts 120. The function and operation of this hold-in circuit has been pointed out previously in connection with the description of the operation for oblique steering.

Because of the similarity of operation between the change from four-wheel to two-wheel steering and the change from oblique steering to two-wheel steering, a detailed description of the operation for changing from four-wheel steering to two-wheel steering has been omitted. It will be noted that the only significant difference between the two changes is that in the shift from four-wheel steering solenoid 80 is de-energized and in the shift from oblique steering solenoid 78 is de-energized. Similarly, the detailed description of operation for changing from four-wheel steering to oblique steering has been omitted because the only basic difference between this and the foregoing detailed description of the change from oblique steering to four-wheel steering is that solenoid 80 is de-energized and solenoid 78 is energized, rather than vice versa.

I intend for the above detailed description of a preferred embodiment of my invention to be illustrative only, and therefore the scope of my invention should be determined from the following appended claims taken in view of the prior art.

I claim:

1. For use in a steering system having first and second dirigible wheel means and a power source, a steering mode selection and wheel synchronization system comprising steering mode selector valve means, first and second means for actuating said selector valve means, steering mode selector switch means connectible to the power source and operable to connect said first actuating means, said second actuating means or neither one of said actuating means to the power source, means for preventing energization of said first or second actuating means when the first wheel means is not disposed in a substantially straight-ahead position, and means for preventing de-energization of said first or second actuating means when the second wheel means is not disposed in a substantially straight-ahead position.

2. A steering mode selection and wheel synchronization system as set forth in claim 1 and including means for preventing energization of one of said actuating means when the other of said actuating means is energized.

3. A steering mode selection and wheel synchronization system as set forth in claim 1 wherein said actuating means are solenoids.

4. For use with a steering system having first and second pairs of dirigible wheels and a power source, a steering mode selection and wheel synchronization system comprising steering mode selector valve means, first and second means for actuating said selector valve means, steering mode selector switch means for connecting said first actuating means, said second actuating means or neither one of said actuating means with the power source, means for preventing energization of said first or second actuating means unless the first pair of wheels is disposed in a substantially straight-ahead position, and means for preventing de-energization of said first or second actuating means unless the second pair of wheels is disposed substantially in its straight-ahead position.

5. For use in a steering system having first and second pairs of dirigible wheels and a power source, a steering mode selection and wheel synchronization system comprising a steering mode selector valve, first and second means for actuating said selector valve, a steering mode selector switch connectible to the power source and operable to connect said first actuating means, said second actuating means or neither one of said actuating means to the power source, means for preventing energization of said first or second actuating means unless the first pair of wheels is disposed substantially in a straight-ahead position, and means for preventing de-energization of said first or second actuating means unless the second pair of wheels is disposed substantially in a straight-ahead position.

6. For use in a steering system having first and second pairs of dirigible wheels, a power source, a steering mode selector valve, first and second means for actuating the selector valve and a steering mode selector switch connectible to the power source and operable to connect the first actuating means, the second actuating means or neither one of the actuating means to the power source, the combination comprising means for preventing energization of the first or second actuating means when the first pair of wheels is not disposed substantially in a straight-ahead position and means for preventing de-energization of the first or second actuating means when the second pair of wheels is not disposed substantially in a straight-ahead position.

7. The combination as set forth in claim 6 and including means for preventing energization of one of the actuating means when the other of the actuating means is energized.

8. For use in a steering system having first and second pairs of dirigible wheels and a power source, a steering mode selection and wheel synchronization system comprising steering mode selector valve means, first and second means for actuating said selector valve means, steering mode selector switch means, a first circuit for connecting said selector switch means to the power source, a normally-closed switch in said first circuit arranged to open when the first pair of dirigible wheels is actuated away from a substantially straight-ahead position, a second circuit for connecting said selector switch means with said first actuating means, a third circuit for connecting said selector switch means with said second actuating means, said selector switch means being operable to connect said first circuit with said second circuit, said third circuit or neither one of said second and third circuits, a first dual switch having a pair of normally-closed contacts forming a part of said second circuit and a pair of normally-open contacts which are operable to open and close respectively when said third circuit is energized, a second dual switch having a pair of normally-closed contacts forming a part of said third circuit and a pair of normally-open contacts which are operable to open and close respectively when said second circuit is energized, a fourth circuit for connecting said first circuit with said second circuit, said third circuit or neither one of said second and third circuits, said fourth circuit including said pairs of normally-open contacts connected in parallel with each other and a normally-open switch in series with said pairs of normally-open contacts and arranged to close when the second pair of dirigible wheels are actuated away from a substantially straight-ahead position, and a pair of normally-open switches connected in parallel with each other and with said normally-closed switch, one of said pair of normally-open switches being operable to close when said second circuit is energized and the other of said pair of normally-open switches being operable to close when said third circuit is energized.

9. For use in a steering system having first and second pairs of dirigible wheels and a power source, a steering mode selection and wheel synchronization system comprising a steering mode selector valve, first and second solenoids for actuating said selector valve, a steering mode selector switch, a first circuit for connecting said selector switch with the power source and including a normally-closed switch responsive to the position of the first pair of dirigible wheels and operable to open only when the first pair of dirigible wheels is not disposed substantially straight-ahead, a second circuit for connecting said selector switch and said first solenoid, a third circuit for connecting said selector switch and said second solenoid, first and second normally-open solenoid-actuated switches connected in parallel with each other and with said normally-closed switch, the solenoids of said normally-open switches being connected respectively to said second and third circuits, and a fourth circuit for connecting said first circuit with said second circuit, said third circuit or neither one of said second and third circuits, said fourth circuit including third and fourth normally-open solenoid-actuated switches connected in parallel with each other and a fifth normally-open switch connected in series with said third and fourth normally-open switches, said third and fourth normally-open switches being connected respectively to said second and third circuits, the solenoid of said third normally-open switch being connected to said third circuit and the solenoid of said fourth normally-open switch being connected to said second circuit, said fifth normally-open switch being responsive to the position of the second pair of dirigible wheels and operable to close only when said second pair of dirigible wheels is not disposed substantially straight-ahead.

10. For use in a steering system having first and second pairs of dirigible wheels and a power source, a steering mode selection and wheel synchronism system comprising a steering mode selector valve, first and second solenoids for actuating said selector valve, a steering mode selector switch, a circuit for connecting said selector switch with the power source and including a normally-closed switch responsive to the position of the first pair of dirigible wheels which is closed only when said first pair of dirigible wheels is disposed substantially straight-ahead, first and second solenoid-actuated dual switches, each dual switch having a pair of normally-closed contacts and a pair of normally-open contacts which are operable to open and close respectively when the respective solenoid is energized, a second circuit for connecting said selector switch and said first solenoid and including the normally-closed contacts of said first dual switch, a third circuit for connecting said selector switch and said second solenoid and including the normally-closed contacts of said second dual switch, said selector switch being operable to connect said first circuit with said second circuit, said third circuit or neither one of said second and third circuits, the solenoids of said first and second dual switches being connected respectively to said third and second circuits, a pair of normally-open solenoid-actuated switches connected in parallel with said normally-closed switch and each other, the solenoids of said normally-open switches being connected respectively to said second and third circuits, and a fourth circuit for connecting said first circuit with said second circuit, said third circuit or neither one of said second and third circuits, said fourth circuit including said normally-open contacts connected in parallel with each other and a normally-open switch responsive to the position of the second pair of dirigible wheels which is open only when the second pair of dirigible wheels is positioned substantially straight-ahead, said last-mentioned normally-open switch being connected in series with said normally-open contacts.

References Cited by the Examiner

UNITED STATES PATENTS

| | | |
|---|---|---|
| 2,424,288 | 7/47 | Severy. |
| 2,512,979 | 6/50 | Strother _____ 180—79.2 |
| 2,777,221 | 1/57 | Ciabattoni _____ 180—79.2 X |

A. HARRY LEVY, *Primary Examiner.*

LEO FRIAGLIA, *Examiner.*